United States Patent
Yoshizawa

(10) Patent No.: US 6,396,614 B1
(45) Date of Patent: May 28, 2002

(54) OPTICAL SIGNAL RECEIVING CIRCUIT AND METHOD FOR RECEIVING OPTICAL SIGNAL

(75) Inventor: Nobukazu Yoshizawa, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/178,812

(22) Filed: Oct. 26, 1998

(30) Foreign Application Priority Data

Oct. 24, 1997 (JP) .................................. 9-292596

(51) Int. Cl.$^7$ .................................. H04B 10/06
(52) U.S. Cl. .................. 359/189; 359/194; 359/195; 250/214 A; 250/214 AG; 250/214 R
(58) Field of Search ................. 359/189, 194, 359/195; 250/214 A, 214 AG, 214 R

(56) References Cited

U.S. PATENT DOCUMENTS

| | | | |
|---|---|---|---|
| 4,498,001 A | * 2/1985 | Smoot | 250/214 |
| 4,623,786 A | * 11/1986 | Rodwell | 250/214 |
| 5,363,064 A | * 11/1994 | Mikamura | 330/308 |
| 5,786,730 A | * 7/1998 | Hadley | 330/59 |
| 5,801,588 A | * 9/1998 | Nishiyama | 330/308 |
| 5,892,616 A | * 4/1999 | Takahashi | 359/341 |

FOREIGN PATENT DOCUMENTS

| | | |
|---|---|---|
| JP | 62-115902 | 5/1987 |
| JP | 63-49839 | 4/1988 |
| JP | 3-178209 | 8/1991 |
| JP | 4-306904 | 10/1992 |
| JP | 6-120743 | 4/1994 |
| JP | 8-23239 | 1/1996 |

\* cited by examiner

*Primary Examiner*—Jason Chan
*Assistant Examiner*—Christina Y Leung
(74) *Attorney, Agent, or Firm*—Young & Thompson

(57) ABSTRACT

It is an object of the invention to provide an optical signal receiving circuit, which secures a dynamic range of a pre-amplifier used therein and can be simply designed without paying special attention to a gain-phase characteristic of a feed back circuit. A resistor is connected in series with a photodiode, and a signal voltage proportional to an input optical signal level is detected by a peak-detecting circuit, an output voltage of which is supplied to a gate of a FET connected in parallel with a fixed feed back resistor of a current feed back amplifier. The feed back resistance is controlled by internal conductance of the FET, which is changed by the gate voltage.

4 Claims, 6 Drawing Sheets

OPTICAL SIGNAL RECEIVING CIRCUIT AND METHOD FOR RECEIVING OPTICAL SIGNAL

FIELD OF THE INVENTION

The invention relates to an optical signal receiving circuit used in an optical signal communication and a method for receiving the optical signal.

BACKGROUND OF THE INVENTION

A primitive optical signal receiving circuit is composed of a photodiode and a simple pre-amplifier of a resistance feed back type. However, in this receiving circuit, the pre-amplifier is saturated in case that an optical signal with a high level is applied to the photodiode, and the optical signal cannot be normally regenerated and a dynamic range cannot be secured.

A conventional optical signal receiving circuit of other type comprises two receiving circuits with different gains, one of which is selected in accordance with the input optical signal level. However, it is difficult to design a selecting circuit for the two receiving circuits, especially in case that the optical signal of a high frequency is received. Moreover, the optical receiving circuit of this type is high-priced as compared with that constituted of single receiving circuit.

Earnest efforts have been made to develop an optical signal receiving circuit, which is constituted of a single receiving circuit and secures a dynamic range. However, it is common to the most of these optical receiving circuits that the pre-amplifier is controlled by means of a feed back circuit. In case that the feed back circuit is used in the amplifier, the feed back circuit is apt to be a cause for oscillation of the amplifier, and particular attention must be paid to the design of the feed back circuit.

SUMMARY OF THE INVENTION

Accordingly, it is an object of the invention to provide an optical signal receiving circuit, which has a low noise characteristic, secures a dynamic range, and is simply designed and low priced.

It is a further object of the invention to provide method for receiving an optical signal, which has a low noise characteristic, secures a dynamic range, and is simple designed and low priced.

According to the first feature of the invention, an optical receiving signal circuit comprises:

a photodiode for converting an input optical signal into a current signal, a current feed back amplifier for converting the current signal supplied from a cathode of the photodiode into a voltage signal, wherein input and output terminals of the current feed back amplifier are connected by a first resistor, a second resistor inserted between a cathode of the photodiode and a terminal of a power supply for a reverse bias voltage, wherein the reverse bias voltage of the cathode of the photodiode is supplied through the second resistor, a peak-detecting circuit for detecting an amplitude of a receiving signal voltage generated by the current signal between both ends of the second resistor, and an adjusting circuit for controlling a feed back current of the current feed back amplifier based on an output voltage of the peak-detecting circuit.

According to the second feature of the invention, a method for receiving an optical signal, in which a photodiode for converting an optical signal into a current signal and a current feed back amplifier having input and output terminals connected by a first resistor for converting the current signal supplied from a cathode of the photodiode into a voltage signal are used, comprises the steps of:

detecting an output current of the photodiode, controlling a feed back current of the current feed back amplifier in accordance with the output current of the photodiode so that the feed back current of the current feed back amplifier is decreased in case that the output current of the photodiode increases and the feed back current of the current feed back amplifier is increased in case that the output current of the photodiode decreases, and stabilizing the output current of the photodiode.

BRIEF DESCRIPTION OF THE DRAWINGS

The invention will be explained in more detail in conjunction with appended drawings, wherein.

DESCRIPTION OF THE PREFERRED EMBODIMENTS

Before explaining an optical signal receiving circuit and a method for receiving the same in the preferred embodiments according to the invention, the aforementioned conventional optical signal receiving circuits will be explained in FIGS. 1 to 3.

Figure 1:
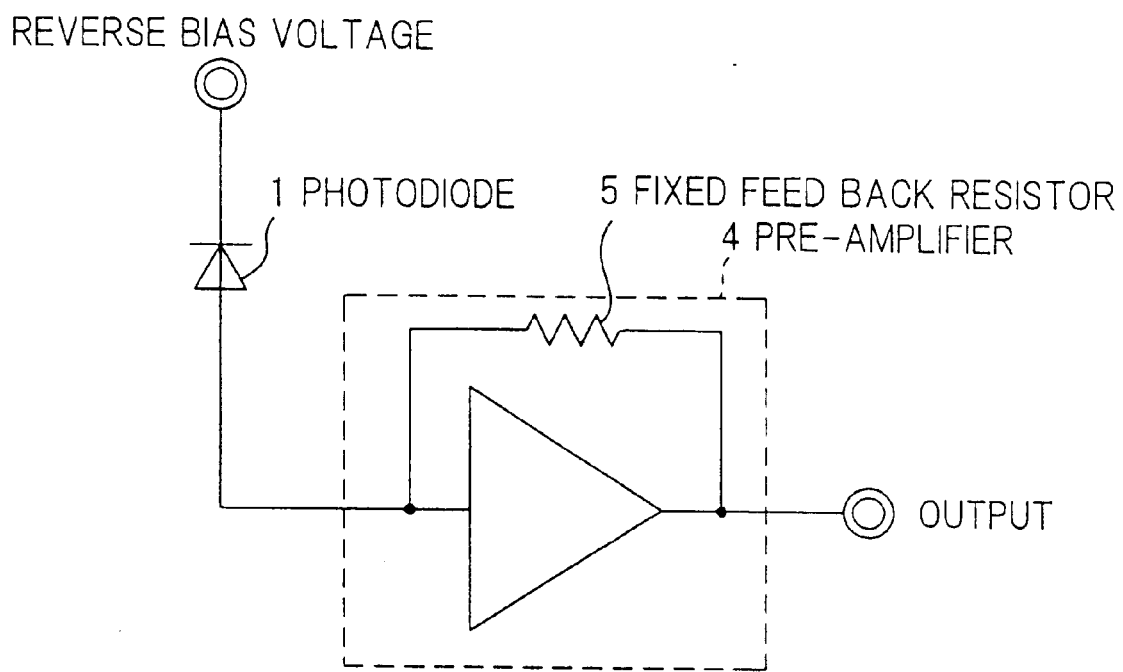
FIG. 1 is a circuit diagram for showing an outline of the first conventional optical signal receiving circuit.
Figure 2:
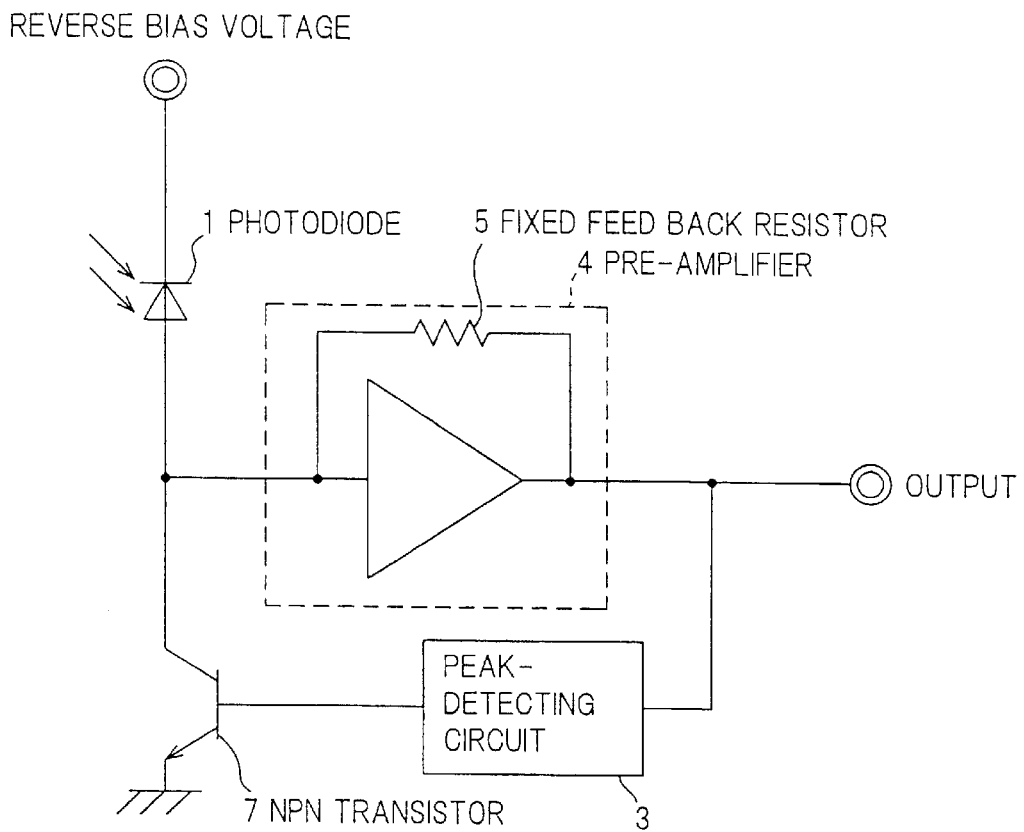
FIG. 2 is a circuit diagram for showing an outline of the second conventional optical signal receiving circuit.
Figure 3:
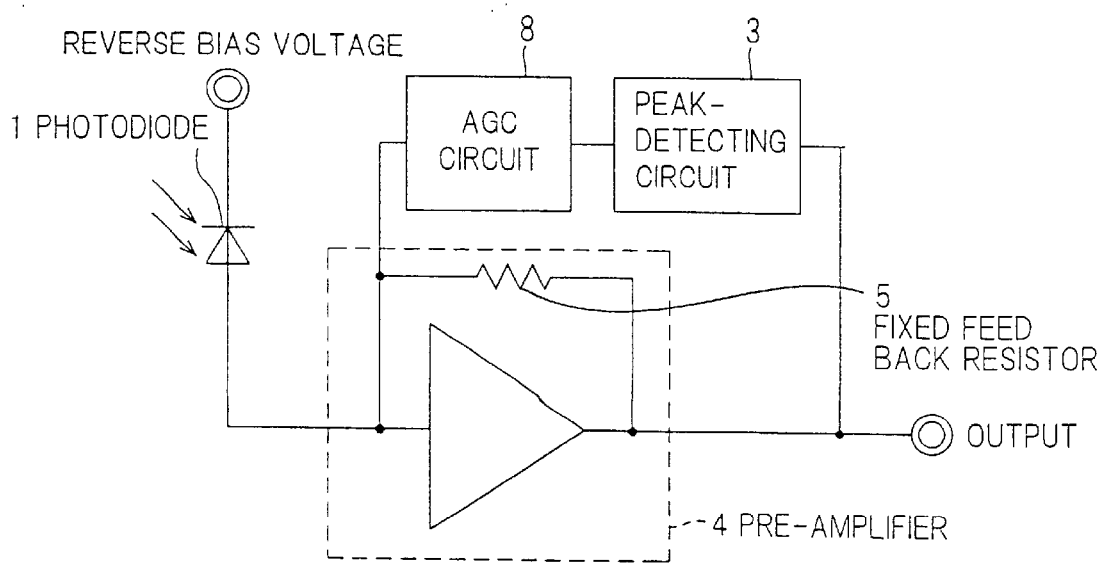
FIG. 3 is a circuit diagram for showing an outline of the third conventional optical signal receiving circuit.

FIGS. 1 to 3 show the first to third conventional optical signal receiving circuits. One of the typical conventional signal receiving circuits is a pre-amplifier of a simple resistance feed type shown in FIG. 1.

In order to secure a stable dynamic range against the variation of the level of an input optical signal, the optical receiving circuit disclosed in Japanese Patent Kokai 62-115902 or 63-49839 is provided with two amplifiers with different gains, and one of them is selected by a selecting circuit in accordance with the level of the input optical signal level.

In a conventional optical signal receiving circuit disclosed in Japanese Patent Kokai 6-120743, which is shown in brief in FIG. 2 as the second conventional circuit, a current is subtracted from a photocurrent, which increases as the input optical signal level increases, before a point, where the photocurrent flows into a feed back resistor. A control used in this circuit is that a peak-detecting circuit detects a peak value of an output of a pre-amplifier, which is supplied to a feed back circuit.

Furthermore, in the optical signal receiving circuit disclosed in Japanese patent Kokai 8-23239, a transimpedance (a feed back resistance, in this case) is changed in accordance with in the input optical signal level. In such a control, as shown in the third conventional circuit (FIG. 3), an amplitude of an output voltage is detected and fed back to an AGC circuit.

In the conventional circuit shown in FIG. 1, which uses the simple pre-amplifier of a resistance feed back type, when the optical signal supplied to the photodiode increases, the pre-amplifier of a resistance feed back type is saturated, the input optical signal cannot be normally regenerated, and the dynamic range cannot be secured.

The conventional circuit disclosed in Japanese Patent Kokai 62-115902 or 63-49839 is provided with the two receiving circuits with different gains, one of which is selected in accordance with the input optical signal level in order to secure the dynamic range. However, it is difficult to construct the selecting circuit in case that the optical signal of a high frequency is received, and since two receiving circuits are necessary, the cost becomes higher than that of the optical signal receiving circuit formed of a single receiving circuit.

In the optical signal receiving circuit disclosed in Japanese Patent Kokai 6-120743, a current is subtracted from a photocurrent, which increases as an input optical signal level increases, before a point, where a photocurrent flows into a feed back resistor. As the result, noise increases in this circuit, because a circuit for subtracting a current from the photocurrent is connected with the input portion of the feed back resistor.

In the circuit disclosed in Japanese Patent Kokai 8-23239, in which the transimpedance is changed in accordance with the input optical signal level, since the differential resistances of diodes are adjusted in accordance with the received optical signal level and the circuit comprises many capacitors, a sufficient band width cannot be achieved, when a optical signal of a high frequency is received.

Moreover, in the aforementioned reference, data forming the basis of a control voltage for controlling the transimpedance and a method for controlling the transimpedance are not clearly disclosed.

As shown in FIGS. 2 and 3, in the optical signal receiving circuits disclosed in Japanese Patent Kokai 6-120743 and 8-23239, it is common to both the circuits that the pre-amplifier is controlled by means of a feed back circuit based on the detected output voltage. However, in case that the feed back circuit is used in the amplifier, it is necessary to secure a gain margin and a phase margin in a gain-phase characteristic, and the feed back circuit is apt to be a cause for oscillation of the amplifier. Accordingly, deep attention must be paid to the gain-phase characteristic in the design of the feed back amplifier.

Next, the invention will be explained referring to the appended drawings.

Figure 4:
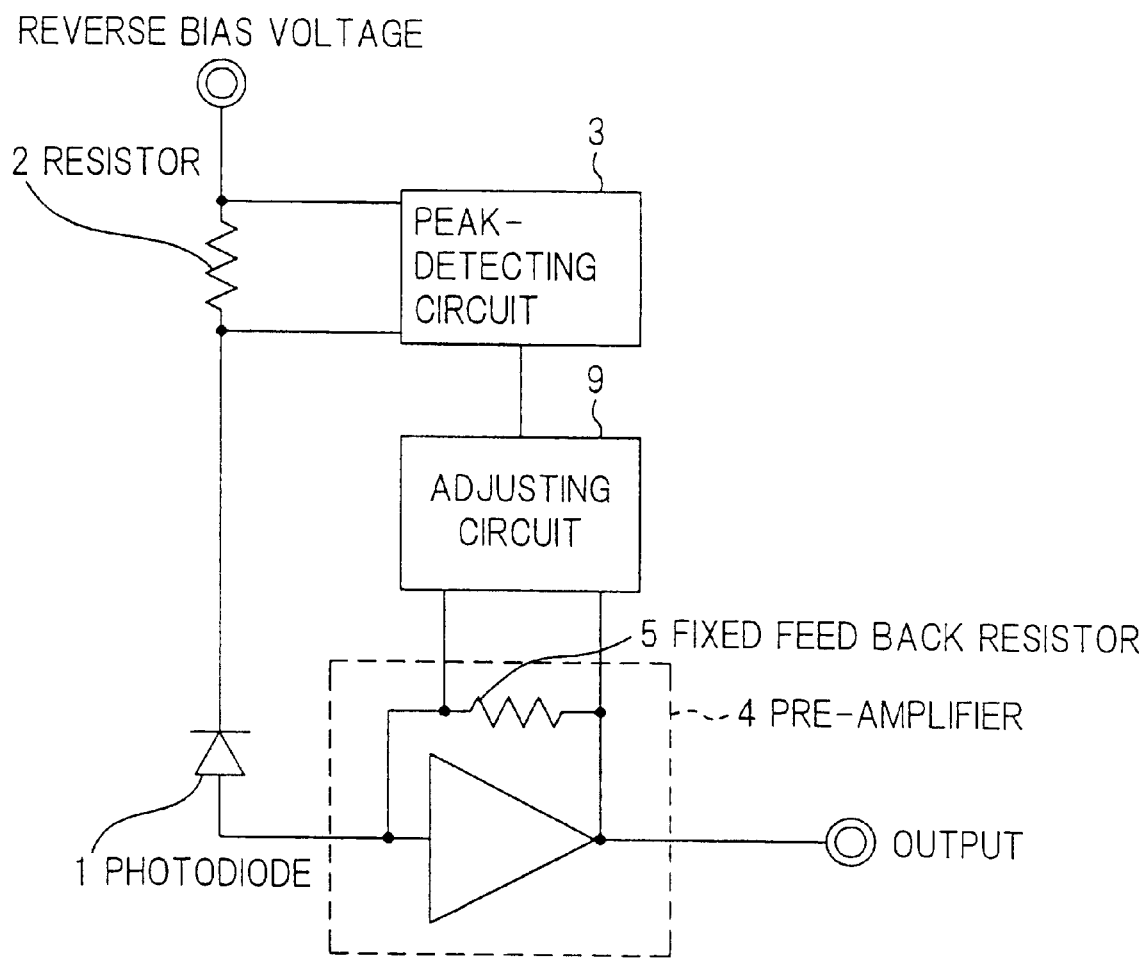
FIG. 4 is a block diagram for showing a principle of an optical signal receiving circuit according to the embodiment of the invention.

FIG. 4 is a block diagram for showing the principle of the invention. The optical signal receiving circuit is composed of a photodiode 1, a resistor 2 connected with a power supply for supplying a reverse bias voltage to a cathode of the photodiode 1, a peak-detecting circuit 3 for measuring a voltage generated by an electric current flowing through the resistor 2, a pre-amplifier 4 having an input terminal connected with an anode of the photodiode 1 and a fixed feed back resistor 5, and an adjusting circuit 9 for controlling a feed back current of the pre-amplifier 4 in accordance with an output voltage of the peak-detecting circuit 3.

An adjusting circuit 9 carries out the adjustment described as follows. When the output of the peak-detecting circuit 3 increases (step 21), the adjusting circuit 9 increases its internal resistance and decreases the feed back current of the pre-amplifier 4 (step 22). When the output of the peak detecting circuit 3 decreases (step 21), the adjusting circuit 9 decreases its internal resistance and increases the feed back current of the pre-amplifier 4 (step 25). When the output current of the photodiode 1 is stabilized (steps 23 and 26), the adjusting circuit 9 maintains the condition of the adjustment (steps 24 and 27).

Figure 5:
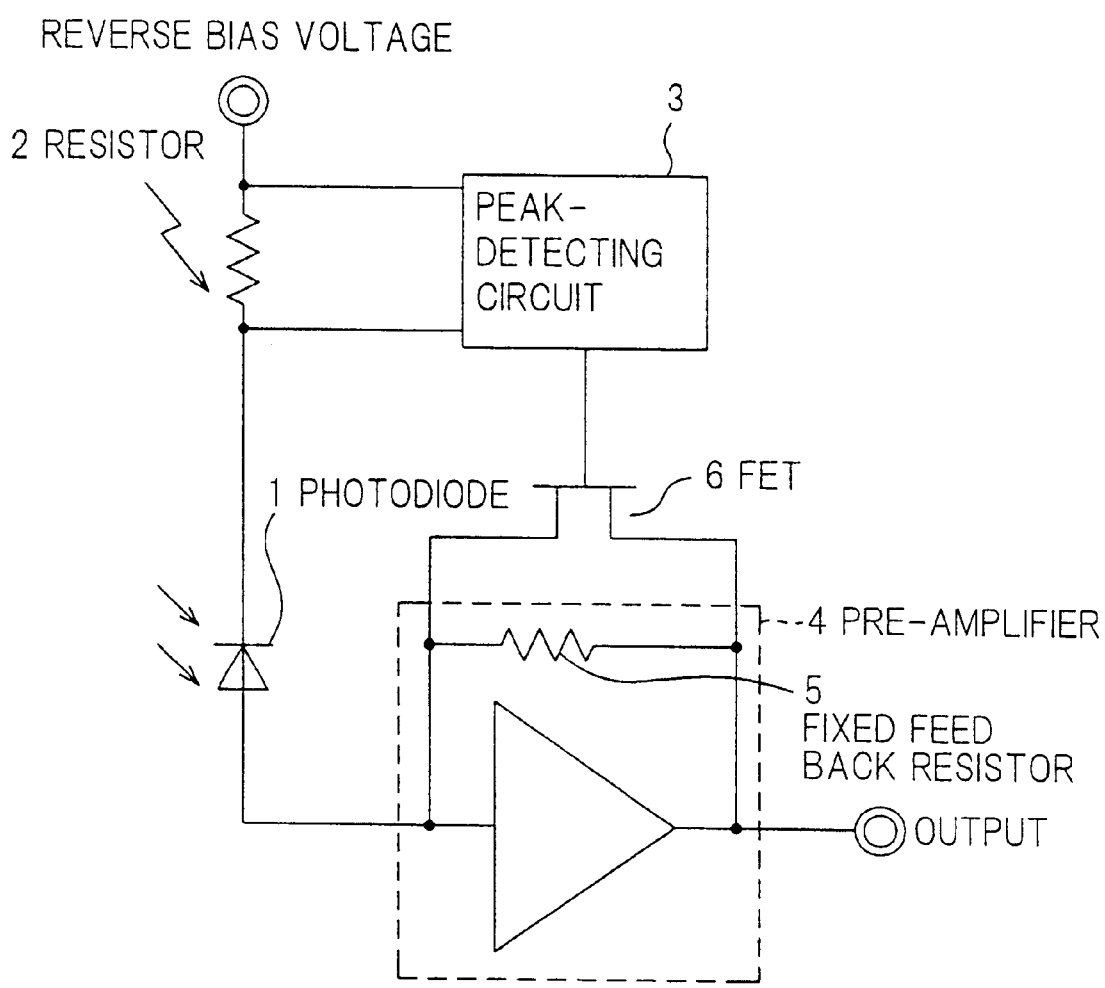
FIG. 5 is a circuit diagram for showing an optical signal receiving circuit according to a preferred embodiment of the invention.
Figure 6:
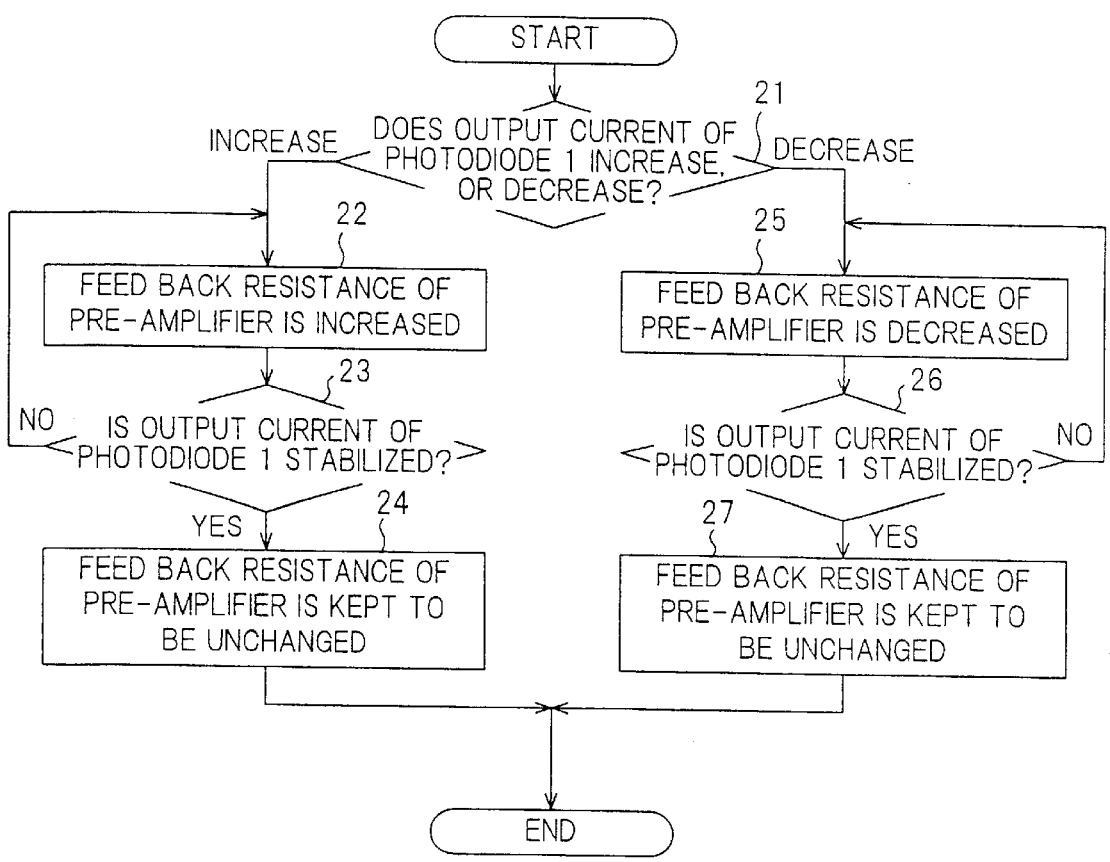
FIG. 6 is a flow chart of a method for receiving an optical signal according to the invention.
Figure 7:
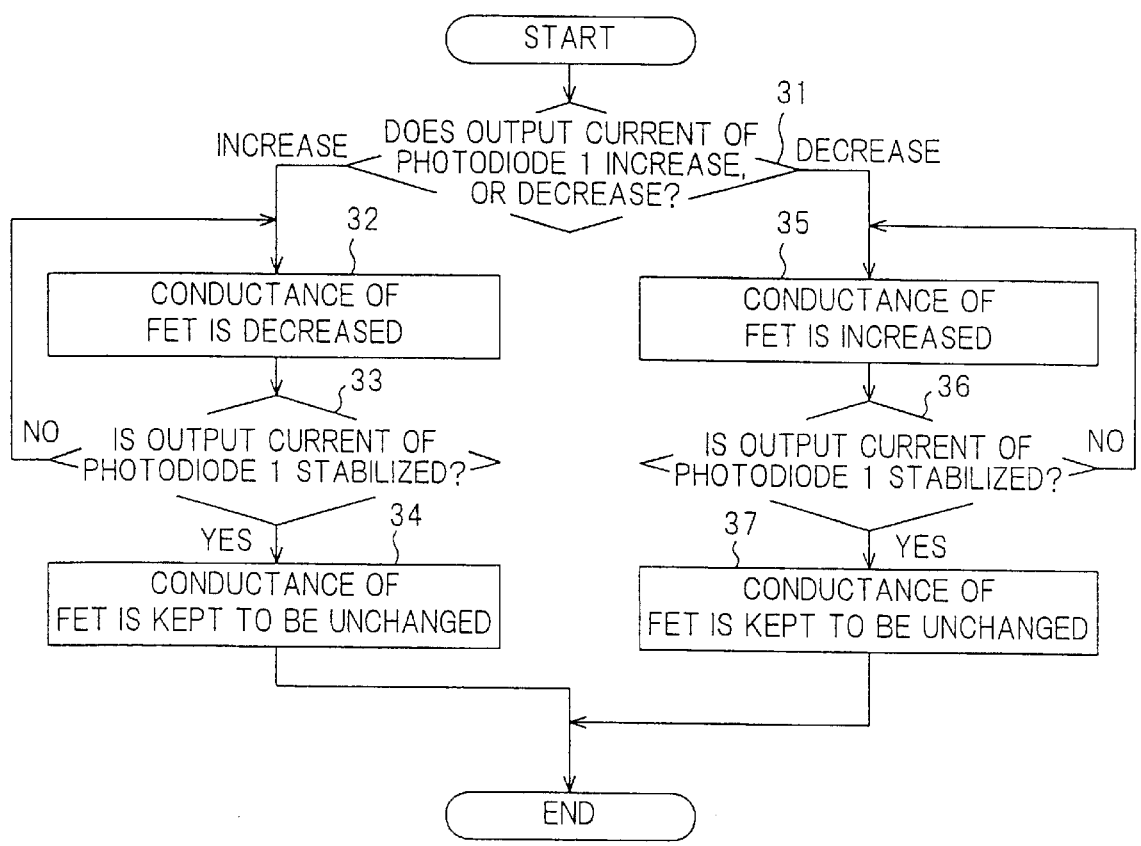
FIG. 7 is a flow chart of an optical signal receiving circuit according to the embodiment of the invention.

FIG. 5 is a circuit diagram for showing the preferred embodiment of the invention.

In general, a photodiode (PD) includes an avalanche photodiode (APD), and a resistor 2 is inserted between a cathode of the photodiode 1 and a power supply for a reverse bias voltage. A signal voltage proportional to an input optical signal level is generated between both the ends of the resistor 2 by a photocurrent of the photodiode 1.

The signal voltage generated by the resistor 2 is supplies to a peak-detecting circuit 3, which generates a voltage corresponding to a peak value of the input signal voltage.

On the other hand, an anode of the photodiode 1 is connected with an input terminal of an ordinary pre-amplifier of a resistance feed back type. A FET 6 is connected in parallel with a fixed feed back resistor 5. A feed back resistance of the pre-amplifier 4 is determined by a combined impedance of a parallel connection of the fixed resistor 5 and an internal resistance of the FET 6.

The output voltage of the peak-detecting circuit 3 is supplied to a gate of the FET 6, and the gate voltage of the FET 6 is controlled by the output voltage of the peak detecting circuit 3.

When the input optical signal level increases and the photocurrent of the photodiode 1 increases (step 31), the amplitude of the signal voltage generated between both the ends to the resistor 2 increases and the output voltage of the peak-detecting circuit 3 increases. Since the gate voltage of the FET 6 increases, the internal conductance of the FET 6 decreases (step 32) and the output current of the photodiode 1 is stabilized (steps 33 and 34). Since the feed back resistance of the pre-amplifier 4 is determined by the combined impedance of the parallel connection of the feed back resistor 5 and the internal resistance of the FET 6, the peak-detecting circuit 3 generates the gate voltage of the FET 6, which is previously set so that the pre-amplifier 4 is not saturated. In general, the internal conductance of the FET 6 is inverse proportional to the gate voltage. In case that the peak-detecting circuit is constituted of a linear amplifier basically, it is possible to design so that the gate voltage of the FET 6 is not saturated. In case that the input optical signal level decreases (step 31), the photocurrent of the photodiode 1 decreases and the signal voltage generated between both the ends of the resistor 2 decreases. Then, the output of the peak-detecting circuit 3 decreases and the gate voltage of the FET 6 decreases, hence the internal conductance of the FET 6 increases (step 35). The feed back resistance of the pre-amplifier 4 decreases so that it is necessary for amplifying the decreased input current, and the current of the photodiode can be stabilized (steps 36 and 37).

Since this control system does not comprise a feed back circuit, there is no necessity for paying a particular attention to the gain-phase characteristic of the feed back circuit and the design of the optical signal receiving circuit can be simplified.

As mentioned in the above, according to a optical signal receiving circuit according to the invention, the dynamic range can be secured without increasing noise by feed forward controlling a FET connected in parallel with the feed back resistor of the pre-amplifier of a resistance feed back type. Moreover, the optical signal receiving circuit can be simply designed, for the particular consideration on the gain-phase characteristic of the feed back circuit is unnecessary, and provided at a low price.

What is claimed is:

1. An optical signal receiving circuit, comprising:

a photodiode for converting and input optical signal into a current signal, a current feed back amplifier for converting said current signal supplied from an anode of said photodiode into a voltage signal, wherein input and output terminals of said current feed back amplifier are connected by a first resistor, a second resistor inserted between a cathode of said photodiode and a terminal of a power supply for a reverse bias voltage, wherein said reverse bias voltage of said cathode of said photodiode is supplied through said second resistor, a peak-detecting circuit for detecting an amplitude of a receiving signal voltage generated by said current signal between both ends of said second resistor, and an adjusting circuit for controlling a feed back current of said current feed back amplifier based on an output voltage of said peak-detecting circuit.

2. An optical signal receiving circuit according to claim 1, wherein:

said adjusting circuit is constituted of a FET, wherein source and drain electrodes of said FET are respectively connected with input and output terminals of said current feed back amplifier, and a gate electrode of said FET is connected with an output terminal of said peak-detecting circuit.

3. An optical signal receiving circuit according to claim 2, wherein:

said FET decreases a conductance between said source and drain electrodes of said FET to decrease said feed back current of said current feed back amplifier in case that said output voltage of said peak detecting circuit increases, and increases said conductance between said source and drain electrodes of said FET to increase said feed back current of said current feed back amplifier in case that said output voltage of said peak detecting circuit decreases.

4. An optical signal receiving circuit according to claim 2, wherein:

said peak-detecting circuit is an amplifier of a liner characteristic so that said current feed back amplifier is not saturated.

* * * * *